(12) United States Patent
Olmstead et al.

(10) Patent No.: US 7,370,223 B2
(45) Date of Patent: May 6, 2008

(54) SYSTEM AND METHOD FOR MANAGING CLUSTERS CONTAINING MULTIPLE NODES

(75) Inventors: Gregory A. Olmstead, King County, WA (US); Gregory I. Thiel, King County, WA (US); Michael D. O'Brien, King Country, WA (US); Peter Gravestock, Queensland (AU)

(73) Assignee: Goahead Software, Inc., Bellevue, WA (US)

( * ) Notice: Subject to any disclaimer, the term of this patent is extended or adjusted under 35 U.S.C. 154(b) by 306 days.

(21) Appl. No.: 10/363,709

(22) PCT Filed: Aug. 17, 2001

(86) PCT No.: PCT/US01/25835

§ 371 (c)(1),
(2), (4) Date: Oct. 20, 2003

(87) PCT Pub. No.: WO02/21276

PCT Pub. Date: Mar. 14, 2002

(65) Prior Publication Data

US 2004/0049573 A1 Mar. 11, 2004

Related U.S. Application Data

(60) Provisional application No. 60/231,451, filed on Sep. 8, 2000.

(51) Int. Cl.
G06F 11/00 (2006.01)

(52) U.S. Cl. .............................. 714/4; 714/3

(58) Field of Classification Search ............... 714/4
See application file for complete search history.

(56) References Cited

U.S. PATENT DOCUMENTS

| | | | |
|---|---|---|---|
| 5,696,896 A * | 12/1997 | Badovinatz et al. | 714/4 |
| 5,793,962 A * | 8/1998 | Badovinatz et al. | 709/201 |
| 5,822,531 A * | 10/1998 | Gorczyca et al. | 709/221 |
| 5,875,290 A * | 2/1999 | Bartfai et al. | 714/13 |
| 6,115,753 A * | 9/2000 | Joens | 709/242 |
| 6,243,825 B1 * | 6/2001 | Gamache et al. | 714/4 |
| 6,353,599 B1 * | 3/2002 | Bi et al. | 370/328 |
| 6,507,863 B2 * | 1/2003 | Novaes | 709/201 |
| 6,735,200 B1 * | 5/2004 | Novaes | 370/390 |
| 6,791,981 B1 * | 9/2004 | Novaes | 370/390 |
| 6,894,975 B1 * | 5/2005 | Partyka | 370/235 |

* cited by examiner

*Primary Examiner*—Scott Baderman
*Assistant Examiner*—Paul F Contino
(74) *Attorney, Agent, or Firm*—James L. Davison (57) ABSTRACT

In clusters of multiprocessor systems it is important that these processor nodes are aware of each others availability and performance capabilities. In highly available systems using these multiprocessor systems there needs to be a method to dynamically bring nodes both into the cluster and to remove nodes out of the cluster. The processor node that is responsible for these actions is designated the manager node (50). The manager node has a pre-selected backup to assume this responsibility upon the inability of said manager node to fulfill its duties. To allow the cluster of nodes to communicate with each other efficiently there needs to be a distributed messaging system that allows for the rapid distribution of data messages among the cluster nodes.

2 Claims, 3 Drawing Sheets

SYSTEM AND METHOD FOR MANAGING CLUSTERS CONTAINING MULTIPLE NODES

This application is entitled to the benefit of the U.S. Provisional Application Ser No. 60/231,451 filed Sep. 8, 2000.

BACKGROUND

A cluster is a cooperating, named set of networked nodes. Nodes can be servers or any other device that has the power to process data. Each node on this network is given a unique network address. Two or more of the nodes in this cluster have the capability of managing the other nodes in the cluster using the software enabled cluster management system (CMS), the basis of which is incorporated in the following present invention. The present invention provides the framework that allows a processing system to tolerate errors and component failures and still maintain a high level of availability to those other systems relying on the before mentioned processing system. The component errors and failures can occur either in the processing system hardware or in its software. In traditional fault tolerant systems there are usually redundant CPUs that are run in tandem with each other, mirroring each other's clocks and instructions. This limits the processing power of those CPUs since there are effectively duplicating the same work. However, in systems utilizing a cluster management system as herein described, the nodes are more loosely coupled and may be performing their own separate tasks until called upon to take over the duties of another node that may be experiencing difficulties. The advantage over the traditional fault tolerant systems is that the present invention gets more work done per processing resource. To achieve this goal it's necessary that there be a great deal of cooperation and coordination between the nodes given this responsibility. In other words the nodes, organized into a cluster, need to designate one node in the cluster as the manager of the cluster. In the preferred embodiment all the capable nodes in a given cluster are given this ability to manage other nodes. Nodes within the cluster are able to serve as substitutes for each other in the face of failure. Note that these nodes generally should not share a system resource that could bring the sharing nodes down if the said shared resource failed. The cluster management system (CMS) of this disclosure enables software developers to build applications that can duplicate key application data; this data may then be shared among the nodes in the cluster, thereby allowing the application to still run regardless of any particular node that is taken off the network. This duplicated data allows an application on node B to rapidly take over the functions of a failed application on Node A with minimum time delay and functionality impact.

SUMMARY

The cluster management system described herein delivers a unified model of node discovery and cluster membership. This system constantly monitors the nodes in the cluster for availability and operation performance. Node failures are quickly detected by the cluster manager that then directs that the services provided by these nodes are quickly replaced by a backup node.

This cluster management system detects node resources within the environment and builds from them a named set of nodes to perform as a cluster. The member nodes are then continuously monitored via heartbeats. Heartbeats are a User Datagram Protocol (UDP) compliant message, using the XML language, an unacknowledged, connectionless method of sending small pieces of data to the applications on the cluster. Other communication between the nodes uses a distributed messaging service (DMS) as explained in the detailed description below.

The present invention enables a model of a distributed system of cluster management. This system allows a node to assume the manager role if the original manager node fails. The present invention also enables the management system to scale, thereby allowing a large number of nodes to be managed. The present invention also enables the system to quickly find added nodes and to quickly shift over to another node if the managing node fails. The invention also allows system administrators to configure the systems, as they deem appropriate.

DETAILED DESCRIPTION

In the present embodiment of the invention each node in a cluster of nodes is given a common set of software-enabled functions. These functions include; the ability to discover and maintain membership of the node in the cluster, the ability to use periodic short data messages as heartbeats, the ability to broadcast its availability to join a cluster and the ability to accept and assign cluster roles.

For communication between nodes and between clusters this embodiment uses a distributed messaging service (DMS).

A description of the DMS is as follows:

The distributed messaging service provides a communication network messaging protocol that provides cross-platform messaging services using either a hardware or a software architecture. This architecture enables cluster-wide communications and enables monitoring and control of "object management" components. Both the communications schema and the monitor and control software components are designed to work together at run time. A message is defined as a set of data transmitted over a communications line. Data therefore becomes a message when transmitted over a network.

A distributed messaging service provides such a method to move said data over a communications line. This data can be sent by one computer system to another computer system, which, in turn, allows the first said computer system to monitor and control the second said system. This capability even extends over different types of computers running different types of software. This service includes application programming interfaces (APIs) that can be called by the user-developed applications.

The distributed messaging service also provides external interfaces to other features and functions for cluster management. The user-developed application may choose to use all or only part of the features made available by these various APIs.

These features may comprise a logging method, a fault managing method, and access to the in-memory database. Message logging is done by storing the messages into a system database; these messages may be retrieved at a later time to support the ability of analyzing prior events.

The messaging service can also provide data between various applications running on the nodes. This allows the applications to checkpoint their state (save a copy of their memory along with the current registry settings), notify other nodes about changes, receive state change notifications themselves, receive information as to their roles, interact with other process services or complete other communications The messaging service encompasses the "publish and subscribe" mode, request/reply model and point-to-point communication.

In the current embodiment the messaging service uses the TCP/IP protocol on top of sockets. A socket is a combination of two numbers, the IP address of the machine and the port number used by the TCP software. A typical connection model allows the application using the messaging service to send messages to the host cluster management process. The host, in turn, delivers the message to other interested applications.

The primary messaging model is "publish and subscribe". This allows applications running throughout the cluster to communicate with each other by registering their interest in specific types of messages. This registration process forms a virtual communication network that is called a channel.

A published message is broadcast to all those applications that had subscribed to that channel regardless of the application location on the cluster. Many publishers can concurrently exist on the same channel.

A publisher of a message can also send a message to a particular receiver. This is accomplished by using a "send" API instead of a "publish" API.

These API's, message routing, and deliveries, can operate identically across different operating system architectures and processor architectures. This allows applications on mixed platforms to communicate. The user applications can handle the conversion of the message, as necessary, to the specific processor being used. The messaging service can also establish a direct connection between two user applications when the highest possible speed is required. This is accomplished by using cluster management process, that is running on the node that contains the application, as a broker. It establishes the communication link between the two nodes and then permits the applications to directly communicate. This direct communication is facilitated by the small library routines incorporated into the applications when the cluster manager is installed. The messaging service can use the computer's multithreading capability to increase system message speed and ensure message delivery.

Route tables are used that can be dynamically, that is "at runtime", updated to ensure that messages are routed only where required. The messaging service can also apply the User Datagram Protocol (UDP), which is a simple, unacknowledged, connectionless protocol, to run small pieces of data called heartbeats to the applications on the cluster that communicates to the system that the resource is up and running (alive). The messaging service can determine detection and notification.

If redundant networking is not supported by the underlying transport, then the messaging service cannot guarantee against in-transit data loss during a network connection failure. However it will detect a network failure and automatically switch over to the standby path. The interested resources will be informed of the switchover and the potential loss of data so the resources can perform their own recovery.

The messaging service uses a naming system that is also used with the list of known subscribers to determine who is to receive the message. Messages have a family/type structure that allows for logical grouping of message types or categories. The message is a packet containing a leader and optional data. The leader includes sender and destination information.

The message "senders" register to publish messages and the "receivers" subscribe to published messages. A given message designated by channel family and type could have zero or more of either registered publishers or subscribers at any given time. The messaging service keeps track of the registered publishers and subscribers.

When the publisher of a message makes a request or asks for a reply, two other types of message methodologies are used. The first is a request message and the second is a reply message. These messages are different from the usual "publish, subscribe" type because they are sent with additional flags set to identify their type. The basic structure of the message is a header followed by data. The header contains version information, the sender's identification, and the destination information. These serve as the routing information. The destination information may be the channel, family and type of message. The header may also contain the size of the data block, a message identification number and the two types of flags previously mentioned. The data portion could be a string or block of binary data. The message service can also request a reply to a message. The reply is sent back to the same channel, family and type that it was received on but it will only be sent to the originator of the request message. The sender will receive an individual reply from all subscribers of the message.

The messaging service may also be used to send a message to a specific receiver. The receiver of the message can specify a callback function to be executed when the message is received. The callback function can receive information from the message and use that information in the application's own subroutine.

The channel a message uses acts as a virtual network. There may be several applications used in the cluster in which messaging is occurring. Each set of applications may only want to message with similar applications. Therefore messages transmitted on one channel are not detected by any other channel. The messaging service also has the capability to publish across all channels simultaneously. It can also set up a direct connection between two applications. The direct connection can be established one of two ways; either using a specified address or brokered. Using a specified address the availability service using the messaging service manages the establishment of the connection. Typically the application sending the message only refers to the target of the message by the role that the target message has been assigned; such as "standby".

The availability service then uses that role name to obtain the exact name and address of the target. The service then sets up the target to accept an authorized connection and informs the sender of the message that it is okay to proceed. The other method is the brokered method. In this case the messaging service running on the availability service handles the process once the sender has determined the message target.

BEST MODE FOR CARRYING OUT THE INVENTION

Figure 1:
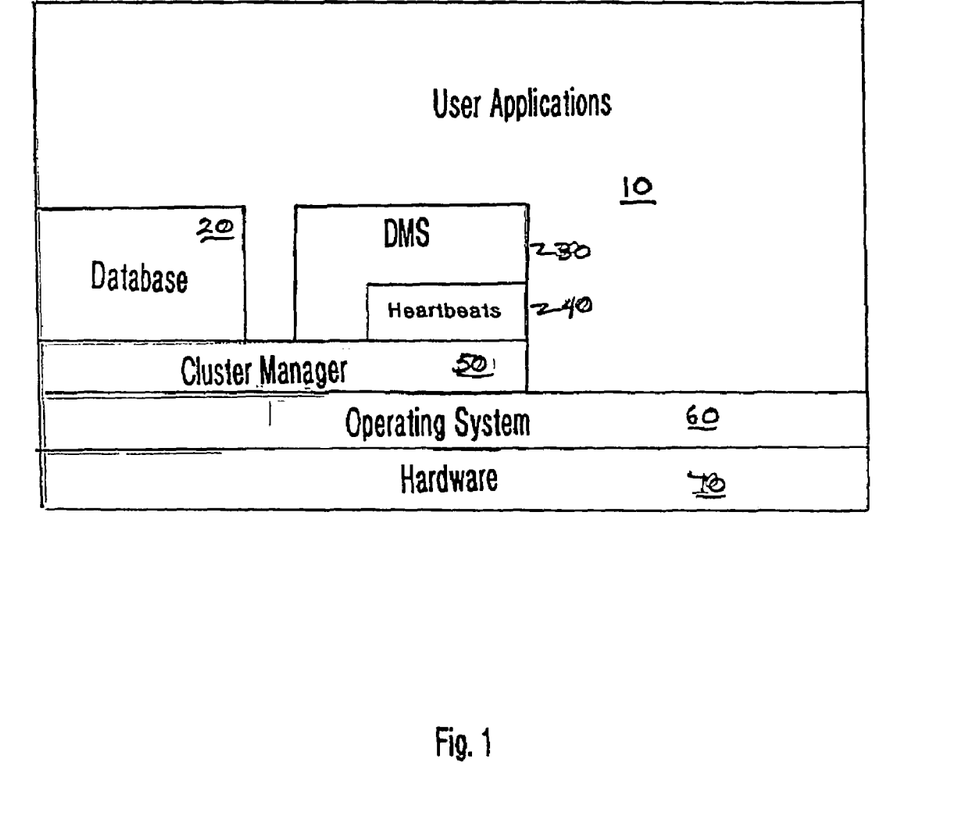
FIG. 1 Shows a node running the processes necessary to implement the cluster manager FIG. 2 Shows a specific node and the various states it may assume FIG. 3 Shows two nodes on a network with each running the cluster manager system FIG. 4 Shows "n" number of nodes on a redundant network and the roles they may assume

In the preferred embodiment of this invention each node in the cluster runs the cluster management application software. FIG. 1 shows a typical node. The hardware 7 includes the processor, the power supply, network components, any I/O components, memory boards, etc. The operating system (O/S) 60 controls the hardware components. The cluster manager 50 acts as middleware between the O/S 60 and the user applications 10. The cluster manager 50 also shares the database 20 capabilities and the messaging system 30 capabilities (which includes the heartbeating role 40) with the user applications 10.

Figure 2:
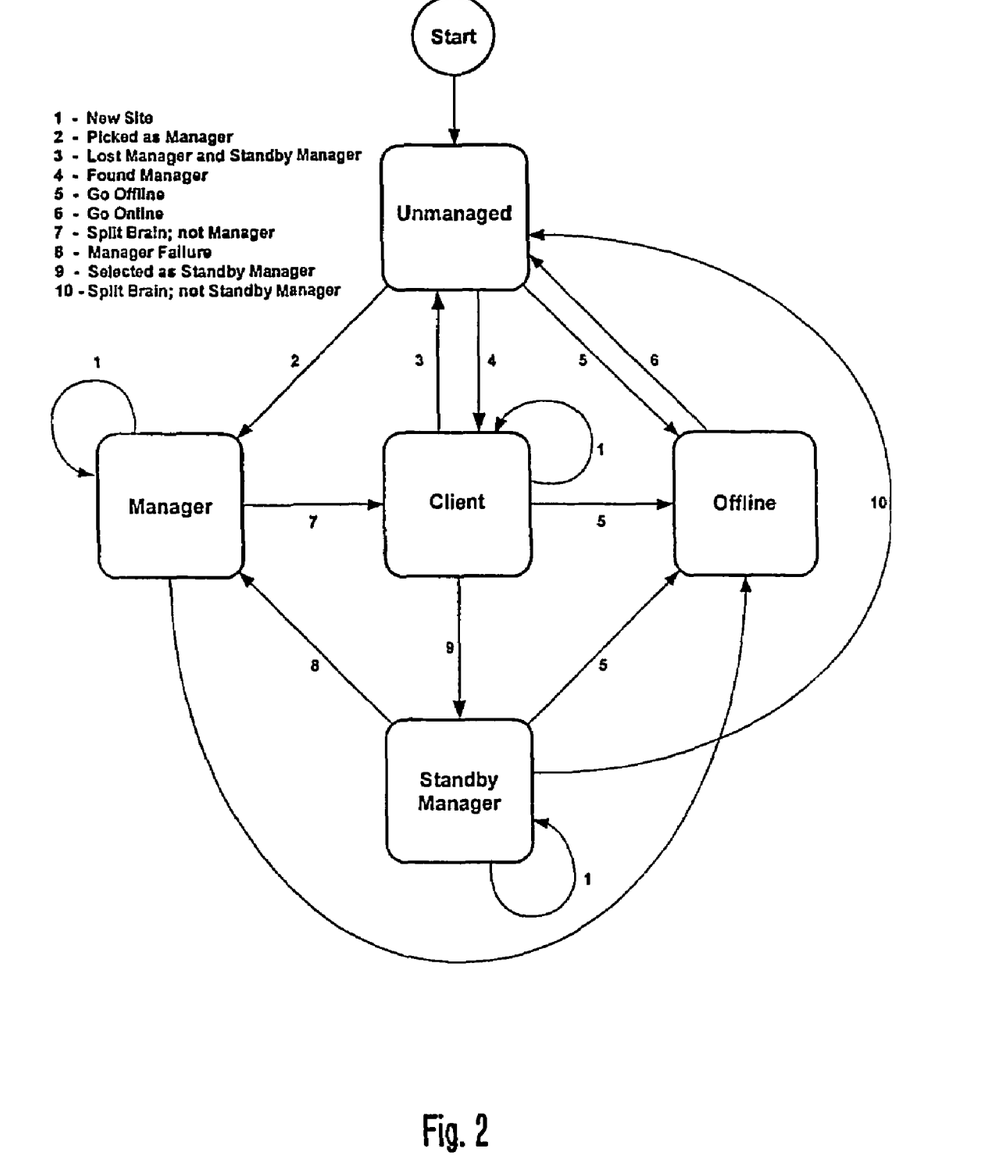

One of the node's cluster management responsibilities is to assume the active role of responding to cluster membership requests and is also responsible for bringing new nodes into the cluster. FIG. 2 shows a single node and the events that can occur to change the role of that node. Event 1 shows the occurrence of a new node coming on-line into the cluster, the node represented in this diagram reconfirms its role as the manager, standby manager, or client node. Event 2 shows a node going from an unmanaged state to a manager state. Event 3 show a node going from a being managed state "client state" to an unmanaged state. Event 4 shows the reverse. Event 5 shows a node going from being a manager, or unmanaged or as a standby manager or as a client, to the offline state. Event 6 shows a node going from a offline state to an unmanaged state. Event 7 shows a node that became a manager in a split-brain occurrence, going to the client role. Event 8 shows a node that was in a backup role going to a manager role (as in the case of the original manager failing). Event 9 shows a client node becoming the standby manager node. Event 10 shows a node that became a standby manager during a split-brain occurrence and then reverting to the unmanaged state upon resolution of the situation. One or more nodes in the cluster may be assigned the role of client. This constrains the node to specific behaviors when it is in the client role. A node in the cluster role of client is always under the direction of another node in the cluster. One of the nodes in the cluster is assigned the role of manager. The manager is in control of the cluster and is responsible for detecting both new nodes in the cluster and the nodes that may have failed in the cluster. Another cluster node role is that of backup manager. A node in this role receives checkpoint data from the cluster manager that enables it to take over, as the cluster manager, should the original cluster manager fail. A node in a cluster may also assume the role of unmanaged. An unmanaged node coming into a cluster actively seeks a cluster manager or other nodes in its cluster. The unmanaged role is the initial role of a node on start up. A node may also transition to this state if the cluster manager and its backup both fail. A node in a cluster may assume the role of offline. An offline node does not actively seek a cluster manager or other nodes. Nor is it actively part of a cluster. The offline cluster role is used during upgrades or other type of maintenance situation. The cluster management system assigns a specific identification to each node in the cluster. There are some nodes in the cluster that may never be allowed to become the cluster manager because of those nodes limitations of memory, processing power or some other lack of capability.

When a cluster of nodes is first established on the network, each node broadcasts its presence and listens for the other nodes. The broadcast includes the cluster name to which it has been assigned, the class of object that it is and any static policies that have been assigned to it.

Each node receives this information and performs the same logic and then using said logic and information casts a ballot (votes) for which node should perform as manager. The then tentatively selected manager performs several steps to complete the formation of the cluster. If all the nodes are equal then the manager criteria is the lowest IP address. The cluster manager uses the messaging service to establish connections with all the client nodes in the cluster. After each connection is established between the manager and the client they then share additional information including the parameters with which to control heartbeats. After these parameters are established the client is then considered a member of the cluster.

The node incorporation process is:
1. Manager: CMS sets a fixed timeout in case of failure.
2. Manager: CMS calls DMS to establish a connection to the new node(s).
3. Client(s): DMS on the client(s) accepts the connection. DMS notifies CMS that a manager has connected.
4. Client(s): CMS set a fixed timeout in case of failure.
5. Client(s): CMS sends a DMS message to the cluster manager with information describing itself. The type of self-describing information includes member identifier, heartbeat port, heartbeat failure period, heartbeat retries in the failed period, http port, host name, NIC information, etc.
6. Manager: CMS receives the DMS message that describes the client and saves the data.
7. Manager: CMS assigns a unique cluster identifier to the node if one does not exist, or it is a duplicate.
8. Manager: CMS sends a DMS message that describes the cluster manager to the client and assigns the client his cluster role.
9. Client(s): CMS receives the DMS message describing the cluster manager and saves the data.
10. Client(s): CMS opens its preferred heartbeat port and starts heartbeat listening thread on the port.
11. Client(s): CMS sends a DMS message to the manager indicating heartbeats can start.
12. Client(s): CMS cancels the timeout set in Step 4.
13. Client(s): CMS changes the node's cluster role from unmanaged to client.
14. Manager: CMS receives the DMS message from the client indicating heartbeats can start and saves the data in client's state table.
15. Manager: CMS cancels the timeout from Step 1.
16. Manager: CMS initiate heartbeats to the client with the specified parameters.
17. Client(s): CMS registers with the availability management service for notification that the availability manager is ready to receive managed object registrations.
18. Client(s): CMS is notified that the availability manager is ready to receive managed object registrations. CMS registers objects for client's cluster node, NICs, etc. CMS cancels its registration ready notification request.
19. Client(s): CMS publishes the DMS broadcast message(s) SRDMS_TYPE_CLUSTER_NEW CLIENT to DMS for delivery to all subscribers. The message(s) includes information describing the new client(s). One message is sent for each new client.

If the timeouts set in Steps 1 and 4 occur, the incorporation process is aborted, and CMS ignores the discovered node until it is again discovered.

The cluster manager detects node failures via repeatedly missed heartbeats. The cluster manager detects new cluster members via their periodic broadcast messages. The cluster manager monitors both heartbeats and the ability of cluster members to receive and respond to messages. If either of these mechanisms fails then the cluster manager considers the cluster client to have failed.

The cluster manager also manages network redundancy. If nodes contain multiple Network Interface Cards (NICs) the cluster manager will automatically heartbeat each node over each NIC. All messaging will be established over all the networks but only one network on each node will be chosen to carry active management traffic. A node with multiple NICs is considered failed if any one of its active NICs fails. If one NIC fails and communication to other nodes experience problems then the cluster manager initiates a switchover to the redundant NICs and network. The cluster manager communicates to the other cluster members various changes that may occur in the cluster.

The cluster management system can also assign virtual network addresses to allow other management systems access to low-level network address management primitives. For example the cluster management system can use calls to control the NIC functions that would normally be controlled by the operating system. The cluster manager sends the outbound heartbeat and the target responds with an inbound heartbeat back to the cluster manager. This occurs on a high priority thread in each node.

The cluster management system determines a client has failed when periodic retries fail to produce an inbound heartbeat after the predetermined number of tries. The node (client or backup manager) determines the cluster manager has failed when it fails to receive a heartbeat for the period of time computed by multiplying the number of retries and retry period. This avoids the need for both the client and cluster manager both individually heartbeating each other.

The backup manager enables the cluster management service to respond to failures quickly since it has access to the checkpoint data from the cluster manager. Checkpoint is a method of recovering from a failure. A checkpoint is a copy of critical portions of a processor memory that is periodically saved. In the event of a failure that last checkpoint serves as a recovery point. The data that the manager uses and checkpoints comprises what resources are available on what nodes and what resources are critical and may be switched to another node when the first node fails or is taken offline.

The backup manager also has active messaging capabilities to all the clients in the cluster. The policy used to select the backup manager is given below. The node selected must be a current client in the cluster.

Bridged IP nodes are used when a cluster wants to include a cluster member that is not on the local network segment. The cluster manager must be configured with the network address and port number for each candidate bridged IP node. The cluster manager periodically attempts to communicate with each specified network address and message system port number. If the bridged IP node is reached the normal membership process proceeds. If a bridged IP node is not reached then the cluster manager periodically attempts a connection. A bridged IP node cannot function in a cluster role other than as a client.

When a cluster manager determines that a client has failed it closes communication to the client. The cluster manager then publishes a broadcast message reporting the failed client to all subscribers. The message includes information describing the lost client. In the case of a cluster manager failure the backup cluster manager responds to the failure. A client will not report that there was a cluster manager failure if it is still successfully communicating with the backup cluster manager. Failure of the cluster manager requires the backup cluster manager to assume all the cluster activities of the cluster manager. The backup cluster manager performs the following steps: 1) Closes the communication channel to the cluster manager; 2) Changes its own role to manager; 3) Informs the clients that it is now the manager; 4) Informs other services that relied on the failed cluster manager and; 5) Publishes a broadcast message to all subscribers describing itself as the new manager. If the cluster manager doesn't fail but instead just the backup manager fails then the backup manager fails in a similar fashion as a cluster manager failure with the original cluster manager selecting a new backup cluster manager. The complete process is this:

Upon the detection of failure of the backup cluster manager the cluster manager closes the communication channel to the backup manager. Clients detecting the failure of the backup manager will ignore the failure unless both the backup manager fails and the manager fails. The system reports the failed backup manager to other interested parties on the network. A message is sent to all the clients to close their communication channel to the failed backup cluster manager and cancel any of the corresponding heartbeat messages.

A new backup manager is then selected. This information is then communicated to the clients. The new backup cluster manager then informs the cluster manager of the new backup's status and established the necessary communication channels. The backup cluster manager then publishes to all subscribers' information about it as the new backup cluster manager.

If the cluster manager and the backup cluster manager both fail then the clients are immediately transitioned to an unmanaged role. The clients publish a broadcast message to all subscribers that the manager and backup manager have been lost and the clients are now unmanaged. Each client is now at the start of a new cluster membership process. If a client has a predetermined static policy of remaining a client then it will remain in the unmanaged role until another client assumes a management role.

There are occasions when a "split brain" will occur. This happens when a cluster has two or more nodes acting as the cluster manager. This most often occurs when a network failure separates the nodes of the cluster.

One of the cluster monitoring functions is to detect this split and initiate resolution. When one cluster manager receives a communication from another cluster manager announcing that the other cluster manager is active then the first cluster manager initiates a merger. A merger is accomplished by beginning the cluster manager selection process over again. The new cluster manager selection follows this order. The system determines which of the two nodes acting as manager is actually the preferred manager by policy first. Then if that is not determinative then the selection defaults to the cluster manager that has accumulated the greatest number of nodes into its cluster. The final criterion for selection is to select the manager that has the lowest IP address.

When the new cluster manager is determined the retiring cluster manager executes the following steps. It tells the new cluster manager who its clients are and then tells all its clients to go to the unmanaged state. The merged cluster manager then initiates the node incorporation sequence with each node identified by the retiring cluster manager. After the node incorporation sequence is completed on each of the retiring cluster manager's nodes the two clusters will be combined into one. There are numerous scenarios that exist in the context of this cluster management system. A few of the typical scenarios are described thusly. A new node for the cluster is installed and brought up. The cluster manager automatically detects the new node and completes the cluster management interchange. The cluster manager service notes what the new node's resources are.

A node in the role of a client fails. The applications depending on that node then terminate. The short XML messages sent to the failed node (the heartbeats) will not be responded to and the cluster manager will mark that node as failed. The process can then mark the resources that were depending on the node as failed and can assign backup resources if available.

The cluster manager is shut down for system maintenance. The backup cluster manager detects heartbeats are not being responded to by the original cluster manager and then initiates itself as cluster manager. The backup cluster manager notifies the clients that it is becoming the cluster manager and then notifies other services that were running on the cluster manager to switch to the backup services that are running on the backup cluster manager. Since the backup cluster manager has open connections and heartbeats to all clients the transition is rapid. Upon completing this transition the new cluster manager informs all the clients of its new status and a new backup cluster manager is selected on the basis of policy information or other criteria.

The backup cluster manager is shut down for system maintenance. The cluster manager detects failed heartbeats and initiates the selection of the new backup cluster manager.

There are three different architectural methods of interaction with an application or an administrator. 1) The configuration parameters can be set and changed via an app.xml file, or 2) via application program interfaces written in embedded Java to enable Active Node Pages web pages to interact with the cluster management service or 3) application program interfaces written in the C language to allow other applications to interact.

In the preferred embodiment the following API's are used:

TABLE 1

XML Field Parameters

| Field Name | Description | Default |
|---|---|---|
| managementNetID | Subnet address of the active management network. | none |
| StandbyNetID | Subnet address of the standby management network. | none |
| NodeClass | AMS node class; can be arbitrary string. | node |
| HttpPort | Network port number for HTTP traffic. | 91 |
| BroadcastPort | Network port number for cluster discovery broadcast. | 1235 |
| BeatPort | Network port number for heart-beating. | 525 |
| SRDMS | Network port number for DMS connections. | 1199 |
| BridgedClients | List of bridged IP nodes. Each member of the list includes network address: portNumber. | none |
| Cluster | Cluster name. | default |
| PreferredRole | Preferred cluster role for this node. | |
| BeatTimeout | Duration of time without a heartbeat that results in a failure. | 1000 ms |
| BeatPackets | Number of heartbeats to send during the beatTimeout period. | 10 |

TABLE 1-continued

XML Field Parameters

| Field Name | Description | Default |
|---|---|---|
| PruneTime | Duration a failed node remains visible in the SRMC until it is removed. | 60000 ms |
| unmanagedTimeout | Duration a node remains unmanaged until it attempts to become a manager. | 1000 ms |
| MgmtBroadcasts | Number of broadcasts sent during the unmanaged timeout period. | 5 |

TABLE 2

C function calls

| C Function Name | Synopsis |
|---|---|
| srClusterAddVirtualIp | Adds a virtual IP address to the active network. |
| srClusterChangeActiveNetwork | Forces the cluster to use the specified network for management traffic. |
| srClusterCompleteGroupConfig | Processes a group of cluster configuration data. |
| srClusterDeleteVirtualIp | Removes a virtual IP address-to the active network. |
| srClusterGetBridgedClientList | Gets the list of potential "bridged clients.". |
| srClusterGetBroadcastMsgs | Gets the number of broadcast messages that an unmanaged member will broadcast before assuming manager role. |
| srClusterGetBroadcastPort | Gets the port for sending broadcasts to the cluster. |
| srClusterGetClientList | Gets the list of client memberId's. |
| srClusterGetClusterName | Gets the name of the cluster to join. |
| srClusterGetDmsPort | Gets the port for use by DMS. |
| srClusterGetHeartbeatPort | Gets the port for receiving heartbeats. |
| srClusterGetHttpPort | Gets the port for interfacing to the web node. |
| srClusterGetLocalId | Gets the local machine's memberId |
| srClusterGetManagerId | Gets the cluster manager's memberId. |
| srClusterGetManagerVip | Gets the manager's virtual ip address. |
| srClusterGetMgtNetId | Gets which network is to be used for management communication. |
| srClusterGetNodeClass | Gets the class of the node to be used upon registration with Availability Manager. |
| srClusterGetNodeOrl | Returns the ORL for the given member id. |
| srClusterGetNodeTimeout | Gets the failover time for a node or network interface. |
| srClusterGetNumberOfHeartbeats | Gets the number of heartbeats missed before a node fails. |
| srClusterGetPreferredRole | Gets the preferred role for the local machine. |
| srClusterGetRole | Get a local machine's cluster role. |
| srClusterGetStandbyId | Gets the standby manager's member id. |
| srClusterGetStandbyNetId | Gets the network to be used whenever the management network fails. |
| srClusterGetTablePruneTime | Gets the time the cluster manager will keep a failed member in table before removing it. |
| srClusterGetUnmanagedTime | Gets the time duration that an unmanaged member will broadcast before assuming manager role. |
| srClusterSetBridgedClientList | Sets the list of potential "bridged clients.". |
| srClusterSetBroadcastMsgs | Sets the number of broadcast messages that an unmanaged member will broadcast before assuming manager role. |
| srClusterSetBroadcastPort | Sets the port for sending broadcasts to the cluster. |
| srClusterSetClusterName | Sets the name of the cluster to join. |

TABLE 2-continued

C function calls

| C Function Name | Synopsis |
|---|---|
| srClusterSetDmsPort | Sets the port for use by DMS. |
| srClusterSetHeartbeatPort | Sets the port for receiving heartbeats. |
| srClusterSetHttpPort | Sets the port for interfacing to the web node. |
| srClusterSetManagerVip | Sets the virtual IP address for the cluster manager. |
| srClusterSetMgtNetId | Sets which network is to be used for management communication. |
| srClusterSetNodeClass | Sets the class of the node to be used upon registration with Availability Manager. |
| srClusterSetNodeOffline | Removes the node from the cluster temporarily. |
| srClusterSetNodeOnline | Allows the node to rejoin the cluster. |
| srClusterSetNodeTimeout | Sets the failover time for a node or network interface. |
| srClusterSetNumberOfHeartbeats | Sets the number of heartbeats missed before a node fails. |
| srClusterSetPreferredRole | Sets the preferred role for the local machine. |
| srClusterSetStandbyManager | Selects a cluster client to be standby manager. |
| srClusterSetStandbyNetId | Identifies the network to be used whenever the management network fails. |
| srClusterSetTablePruneTime | Sets the time the cluster manager will keep a failed member in table before removing it. |
| srClusterSetUnmanagedTime | Sets the time duration that an unmanaged member will broadcast before assuming manager role. |
| SrClusterStartGroupConfig | Starts a transaction to change cluster configuration settings. |

TABLE 3

Embedded JavaScript function calls

| EJ Function Name | Synopsis |
|---|---|
| srEjClusterCompleteGroupConfig | Processes a group of cluster configuration data. |
| srEjClusterGetBridgedClientList | Gets the list of potential "bridged clients". |
| srEjClusterGetBroadcastMsgs | Gets the number of broadcast messages that an unmanaged member will broadcast before assuming manager role. |
| srEjClusterGetBroadcastPort | Gets the port for sending broadcasts to the cluster. |
| srEjClusterGetClusterName | Gets the name of the cluster to join. |
| srEjClusterGetDmsPort | Gets the port for use by DMS. |
| srEjClusterGetHeartbeatPort | Gets the port for receiving heartbeats. |
| srEjClusterGetHttpPort | Gets the port for interfacing to the web node. |
| srEjClusterGetLocalId | Gets the local machine's memberId. |
| srEjClusterGetManagerId | Gets the cluster manager's memberId. |
| srEjClusterGetManagerVip | Gets the manager's virtual ip address. |
| srEjClusterGetMgtNetId | Gets which network is to be used for management communication. |
| srEjClusterGetNodeClass | Gets the class of the node to be used upon registration with Availability Manager. |
| srEjClusterGetNodeOrl | Returns the ORL for the given member id. |
| srEjClusterGetNodeTimeout | Gets the failover time for a node or network interface. |

TABLE 3-continued

Embedded JavaScript function calls

| EJ Function Name | Synopsis |
|---|---|
| srEjClusterGetNumberOfHeartbeats | Gets the number of heartbeats missed before a node fails. |
| srEjClusterGetPreferredRole | Gets the preferred role for the local machine. |
| srEjClusterGetStandbyId | Gets the standby manager's member id. |
| srEjClusterGetStandbyNetId | Gets the network to be used whenever the management network fails. |
| srEjClusterGetTablePruneTime | Gets the time the cluster manager will keep a failed member in table before removing it. |
| srEjClusterGetUnmanagedTime | Gets the time duration that an unmanaged member will broadcast before assuming manager role. |
| srEjClusterSetBridgedClientList | Sets the list of potential "bridged clients". |
| srEjClusterSetBroadcastMsgs | Sets the number of broadcast messages that an unmanaged member will broadcast before assuming manager role. |
| srEjClusterSetBroadcastPort | Sets the port for sending broadcasts to the cluster. |
| srEjClusterSetClusterName | Sets the name of the cluster to join. |
| srEjClusterSetDmsPort | Sets the port for use by DMS. |
| srEjClusterSetHeartbeatPort | Sets the port for receiving heartbeats. |
| srEjClusterSetHttpPort | Sets the port for interfacing to the web node. |
| srEjClusterSetManagerVip | Sets the virtual IP address for the cluster manager. |
| srEjClusterSetMgtNetId | Sets which network is to be used for management communication. |
| srEjClusterSetNodeClass | Sets the class of the node to be used upon registration with Availability Manager. |
| srEjClusterSetNodeOffline | Removes the node from the cluster temporarily. |
| srEjClusterSetNodeOnline | Allows the node to rejoin the cluster. |
| srEjClusterSetNodeTimeout | Sets the failover time for a node or network interface. |
| srEjClusterSetNumberOfHeartbeats | Sets the number of heartbeats missed before a node fails. |
| srEjClusterSetPreferredRole | Sets the preferred role for the local machine. |
| srEjClusterSetStandbyNetId | Identifies the network to be used whenever the management network fails. |
| srEjClusterSetTablePruneTime | Sets the time the cluster manager will keep a failed member in table before removing it. |
| srEjClusterSetUnmanagedTime | Sets the time duration that an unmanaged member will broadcast before assuming manager role. |
| srEjClusterStartGroupConfig | Starts a transaction to change cluster configuration settings. |

TABLE 4

Notification messages
The Cluster Management Service sends the above events under the indicated conditions:

| | |
|---|---|
| SRDMS_TYPE_CLUSTER_NEW_BACKUP_MANAGER | Broadcast by manager - the cluster manager has just promoted a new standby manager. The standby manager member ID is contained in the message data. |
| SRDMS_TYPE_CLUSTER_BACKUP_MANAGER_LOST | Broadcast by manager - the manager has lost communications with or demoting its standby manager. The |

TABLE 4-continued

Notification messages
The Cluster Management Service sends the above events under the indicated conditions:

| | |
|---|---|
| SRDMS_TYPE_CLUSTER_ UNMANAGED | standby manager member ID is contained in the message data. Published to local apps and solution packs - a cluster member is unmanaged. This occurs at startup or when a client has lost its manager. This message will only be received only on local applications or solution packs since there is no DMS connection available to the cluster. The member ID is contained in the message data. |
| SRDMS_TYPE_CLUSTER_ MANAGED | Published to local apps and solution packs - a cluster member has joined the cluster, i.e. gone from unmanaged to managed. The member ID is contained in the message data. |

Figure 3:
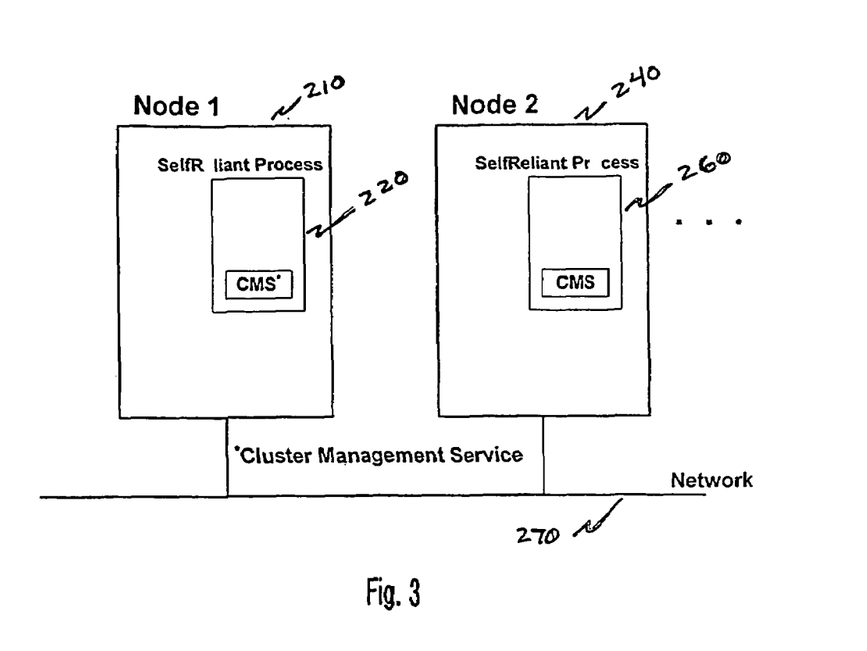
Figure 4:
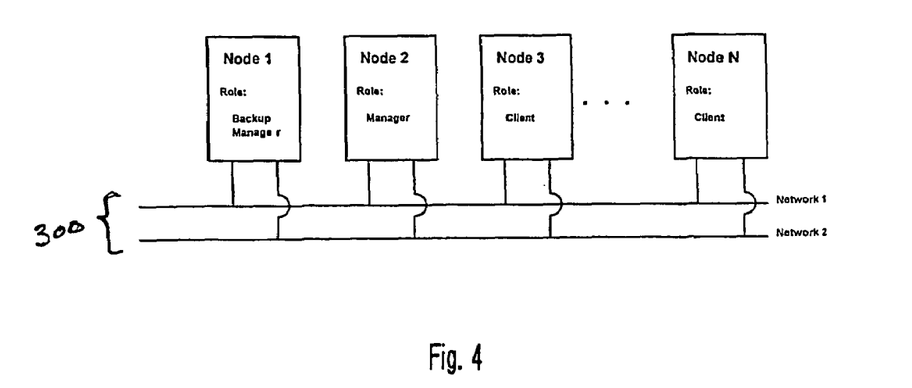

FIG. 3 shows a single channel network with the cluster management process running on each node. Node 1 210 running the cluster management system 220 Is connected to Node 2 240 running cluster management system 260 through a single network connection 270. It should be apparent that if the network connection 270 fails or otherwise becomes defective then the cluster management system will also fail due to a lack of communication abilities. FIG. 4 shows a more effective system. Nodes 1 through N communicate using a redundant network connection 300 thereby maintaining communication with each other even if one connection fails. While the preferred embodiments of the invention have been shown and described, it will be apparent to those skilled in this art that various modifications may be made to these embodiments without departing from the spirit of the present invention. For that reason, the scope of the invention is set forth in the following claims.

We claim:

1. A system for establishing failover capability in networked systems comprising:
   a) a distributed messaging system established among nodes of a networked system, with said distributed messaging system allowing a specific type of application on the node to register said specific type of application's interest in forming a channel of communication with other said specific types of applications on other nodes;
   b) a cluster of nodes, established by said channel of communication, working together to establish a common goal in the networked system;
   c) a cluster manager selected by the cluster of nodes as being qualified for that role, using said channel of communication;
   d) a backup cluster manager selected by the cluster manager as being qualified for that role using said channel of communication;
   e) a failover policy whereupon the backup cluster manager assumes the role of cluster manager upon an inability of the cluster manager to operate within the bounds of a predetermined standard; and
   f) a former client node then becoming a new backup cluster manager as selected by the new cluster manager from a list of qualified nodes in the cluster.

2. The system of claim 1 further including the cluster manager and the backup cluster manager establishing heartbeats to the other nodes in the cluster designated as client nodes, whereupon the client nodes upon receipt of said heartbeat respond with a corresponding heartbeat back to the cluster manager and the backup cluster manager.

* * * * *